United States Patent [19]

Ueno

[11] Patent Number: 4,553,219
[45] Date of Patent: Nov. 12, 1985

[54] TYPEWRITER HAVING CALCULATING CAPABILITY

[75] Inventor: Hideo Ueno, Nagoya, Japan

[73] Assignee: Brother Kogyo Kabushiki Kaisha, Aichi, Japan

[21] Appl. No.: 426,136

[22] Filed: Sep. 28, 1982

[30] Foreign Application Priority Data

Sep. 30, 1981 [JP] Japan .................................. 56-145947

[51] Int. Cl.$^4$ ................................................ G06F 7/00
[52] U.S. Cl. ..................................... 364/705; 364/709; 400/78; 400/80
[58] Field of Search ... 364/705, 709, 710, 200 MS File, 364/900 MS File; 400/77, 78, 83

[56] References Cited

U.S. PATENT DOCUMENTS

| 3,265,874 | 8/1966 | Soule, Jr. et al. | 364/709 |
| 4,106,101 | 8/1978 | Harrison | 364/710 |
| 4,319,130 | 3/1982 | Spitzner | 364/709 |
| 4,402,056 | 8/1983 | Sado et al. | 364/705 |

Primary Examiner—James D. Thomas
Assistant Examiner—Dale M. Shaw
Attorney, Agent, or Firm—Browdy and Neimark

[57] ABSTRACT

A typewriter having a calculating function, comprising: a keyboard having a plurality of character keys including letter, numeral and arithmetic symbol keys; an arithmetic unit for performing an arithmetic operation designated by at least one of the arithmetic symbol keys, based on plural sets of numeric data each representing a numerical value and entered through the numeral keys; a main control unit for selecting the plural sets of numeric data as operands from among successive sets of data entered corresponding to the sequential operation of the character keys, such that only the set of numeric data which is entered last prior to each operation of any one of the arithmetic symbol keys is regarded as one of the plural sets of numeric data representing the operands, the main control unit directing the arithmetic unit to perform the arithmetic operation based on the selected plural sets of numeric data or operands, and reading out a result of the arithmetic operation from the arithmetic unit; and a printing device printing a succession of characters entered by the character keys, and the result of arithmetic operation read out by the main control unit, the result being printed following the succession of characters entered through the keyboard. There is also disclosed a method of printing on a typewriter a succession of characters including a statement representing an arithmetic operation. The printing method includes a step of judging whether a set of numeric data is to represent an operand of the arithmetic operation or not.

8 Claims, 5 Drawing Figures

TYPEWRITER HAVING CALCULATING CAPABILITY

BACKGROUND OF THE INVENTION

The present invention relates to a typewriter having a calculating function or arithmetic capability, which is capable of not only printing a succession of characters including letters, numerals and arithmetic symbols selected by corresponding keys on the keyboard, but also performing an arithmetic operation designated by an arithmetic symbol key and printing a result of the operation following the keyed-in characters, the arithmetic operation being performed based on numeric data entered through numeral keys on the keyboard.

In a typewriter having a calculating function known in the art, there are available two different modes of operation: a printing mode for printing a succession of characters such as letters, numerals and arithmetic symbols selected by the keyboard keys; and an arithmetic operation mode for performing a mathematical operation defined by an arithmetic operator represented by an arithmetic symbol key and by numeric data entered as operands through numeral keys. In such prior art typewriter, however, there is a recognized drawback in the printing mode that although it is possible to print numerical values followed by a letter or letters to identify the meaning of such values in combination with an arithmetic operator designating symbol or symbols, it is impossible to perform an arithmetic or mathematical operation given by the arithmetic symbol and numerical values followed by identifying letters, and therefore impossible to print the result of operation within a line of statements including letters, numerical values and arithmetic symbols. In the arithmetic operation mode, there is another drawback that no letters are allowed to exist within an arithmetic equation consisting of numerical values and an arithmetic symbol or symbols. In other words, it is not possible to print an arithmetic equation including letters for identifying the numerical values given as operands.

SUMMARY OF THE INVENTION

The present invention was made in view of the above drawbacks recognized in the art. It is accordingly an object of the invention to provide a typewriter having a caculating function, which is capable of performing an arithmetic operation which is defined by an arithmetic symbol key or keys and numerical values entered in the form of combined numerals and letters, and which is further capable of printing a result of the arithmetic operation within a line of statement including letters, numerical values and arithmetic symbols, thereby assuring increased operating efficiency and improved data recordability.

Another object of the invention is to provide a method of printing on a typewriter a succession of characters including a statement representing an arithmetic operation, and a result of the operation following the succession of characters entered through the typewriter keyboard.

According to the present invention, there is provided a typewriter having a calculatng function, which comprises: a keyboard having a plurality of character keys including letter keys, numeral keys and arithmetic symbol keys; arithmetic means for performing an arithmetic operation designated by at least one of the arithmetic symbol keys, based on plural sets of numeric data each representing a numerical value and entered through the numeral keys; main control means for selecting said plural sets of numeric data as operands from among successive sets of data entered corresponding to the sequential operation of the letter, numeral and arithmetic symbol keys, such that only the set of numeric data which is entered last prior to each operation of any one of the arithmetic symbol keys is regarded as one of said plural sets of numeric data, the main control means directing the arithmetic means to perform the arithmetic operation based on the selected plural sets of numeric data, and reading out a result of the arithmetic operation from the arithmetic means; and a printing device printing a succession of characters entered by the letter, numeral and arithmetic symbol keys, and the result of arithmetic operation read out by the main control means, the result being printed following the succession of letters.

According to the invention, there is also provided a method of printing on a typewriter a succession of characters including a statement representing an arithmetic equation, which comprises the steps of: operating letter keys, numeral keys and arithmetic symbol keys on a keyboard of the typewriter to provide keyboard signals representing the succession of characters including at least one arithmetic symbol and numerical values serving as operands, which symbol and operands defining an arithmetic operation, as well as letters and other numerical values not serving as operands; causing a tored program computer to select sets of numeric operand data corresponding to the numerical values serving as operands from among plural sets of numeric data represented by those of the keyboard signals which are generated corresponding to the operation of the numeral keys, such that only the set of numeric data which is entered last prior to each operation of any one of the arithmetic symbol keys is regarded as the numeric operand data; performing the arithmetic operation based on the sets of numeric operand data selected by the stored program computer; and printing the succession of characters entered through the keyboard, and a result of the arithmetic operation following the succession of characters.

In a typewriter in accordance with the invention, provisions are made for performing an arithmetic or mathematical operation which is given in the form of a statement including letters as well as an arithmetic operator or operators selected by an arithmetic symbol key or keys and numerical values entered through numeral keys, and for printing a result of the arithmetic operation as well as the statement describing the arithmetic operation. This arrangement provides an advantage that the arithmetic equation may be printed in the form of a statement including alphabetic letters indicating units of the numerical values such as "m", "km", "g" and "kg" or other kinds of letters or words for remarks associated with the numerical values within the equation, whereby allowing easy understanding of the significance of the printed equation, and improving operating efficiency and data recordability of the typewriter.

According to a method of printing of the invention, only the set of numeric data which is the last numeric data prior to an arithmetic symbol ($+$, $-$, $\times$, $\div$ and $=$) is regarded as an operand of an arithmetic operation even when that set of numeric data is followed by some alphabetic letters. Thus, for example, a set of numeric data which represents the last numerical value before a selected operator (×) is deemed as a first operand, and another set of numeric data which represents the last numerical value preceding an equality symbol (=) is regarded as a second operand of the multiplying operation. According to another aspect of the present method, an arithmetic operation defined by a selected operator and operands is calculated and a result of the operation is printed immediately following the printed statement describing the given arithmetic operation.

BRIEF DESCRIPTION OF THE DRAWINGS

The above and other objects, advantages and features of the present invention will become more apparent from the following description of the preferred embodiment taken in connection with the accompanying drawings in which.

DETAILED DESCRIPTION OF THE PREFERRED EMBODIMENT

Figure 1:
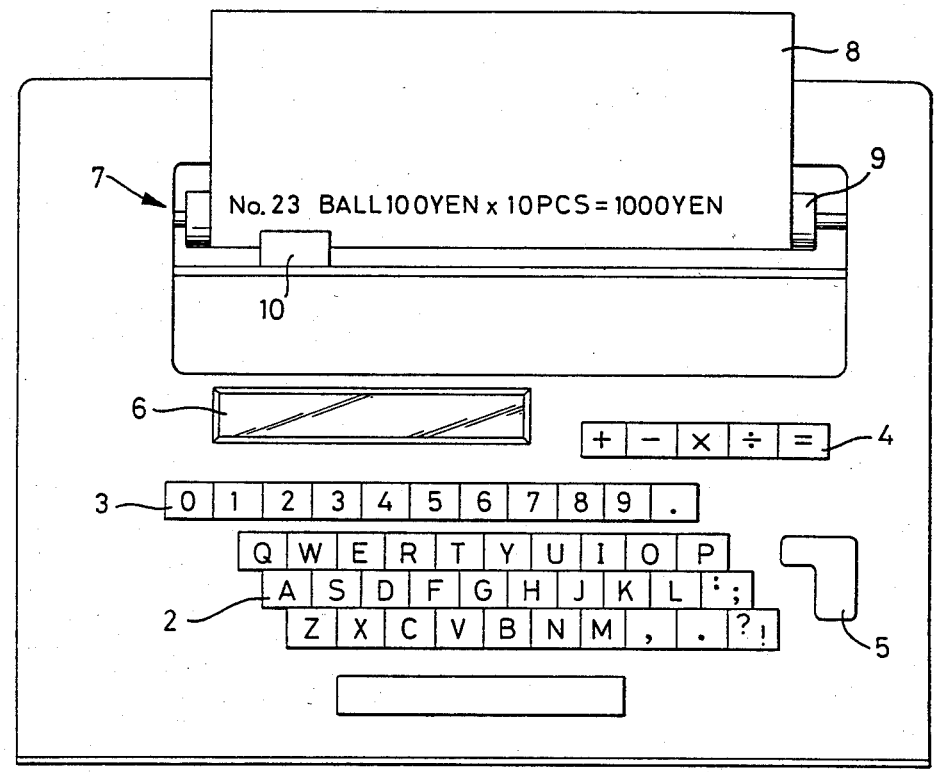
FIG. 1 is a schematic illustration of a typewriter having a calculating capability according to this invention.

Referring more particularly to the accompanying drawings which show the present invention in its preferred form, there is schematically illustrated in FIG. 1 a typewriter having a calculating function or capability wherein a keyboard 1 includes a multiplicity of letter keys 2 for entry of alphabets and associated symbols, a plurality of numeral keys 3 for entry of numeric data, arithmetic symbol keys 4 for arithmetic operation on the entered numeric data, and a carriage return key 5. The equality key (=) of the arithmetic symbol keys 4 and the carriage return key 5 are special function keys.

The keyboard 1 further includes a display 6 having a predetermined number of digits or indicator sections, each digit or section being for example in the form of a 5×7 liquid crystal dot matrix, which indicates designated characters, i.e., alphabetic letters and the related symbols, numerals and arithmetic symbols, which are selected by the appropriate keys 2, 3, 4.

Also illustrated in FIG. 1 is a printing device 7 comprising a platen 9 on which is placed a sheet of heat-sensitive paper 8, and a thermal print head 10, for example, of a 5×7 dot matrix, which is mounted on a carriage (not shown) and reciprocatingly moved left and right along a line of printing on the heat-sensitive paper 8 to print thereon a series of letters, numerals and arithmetic symbols which are sequentially selected by the corresponding keys 2, 3, 4.

Figure 2:
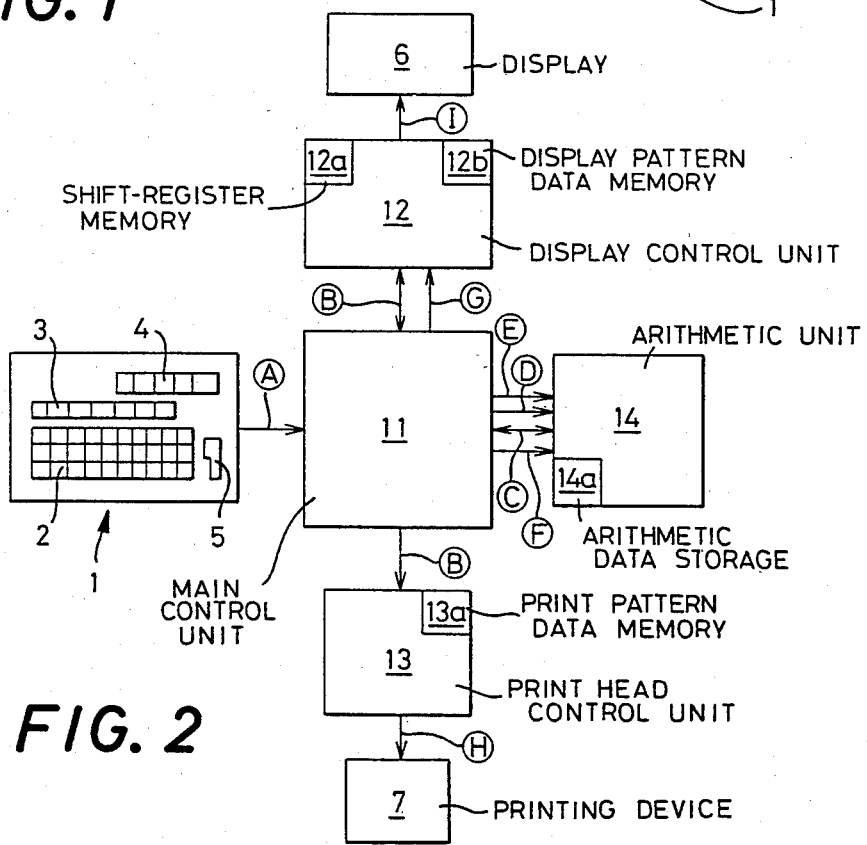
FIG. 2 is a schematic block diagram showing an electronic arrangement of the typewriter of FIG. 1.

Referring to FIG. 2 which is a schematic block diagram, there is shown an electronic arrangement of the typewriter of the invention wherein the keyboard 1 serving as an input device is connected to a main control unit which is connected to a display control unit 12, a print head control unit 13 and an arithmetic unit 14. The display control unit 12 includes a shift-register memory 12a and a display pattern data memory 12b and is adapted to control the display 6 which is one of output devices, and the print head control unit 13 includes a print pattern data memory 13a and is adapted to control the printing device 7 which is another output device. The arithmetic unit 14 comprises an arithmetic data storage 14a which includes a first and a second operand memory. While the above four units 11, 12, 13 and 14 are constructed of a stored program computer in this specific embodiment, they are referred to as "units" for easier understanding of the arrangement.

Figure 3A:
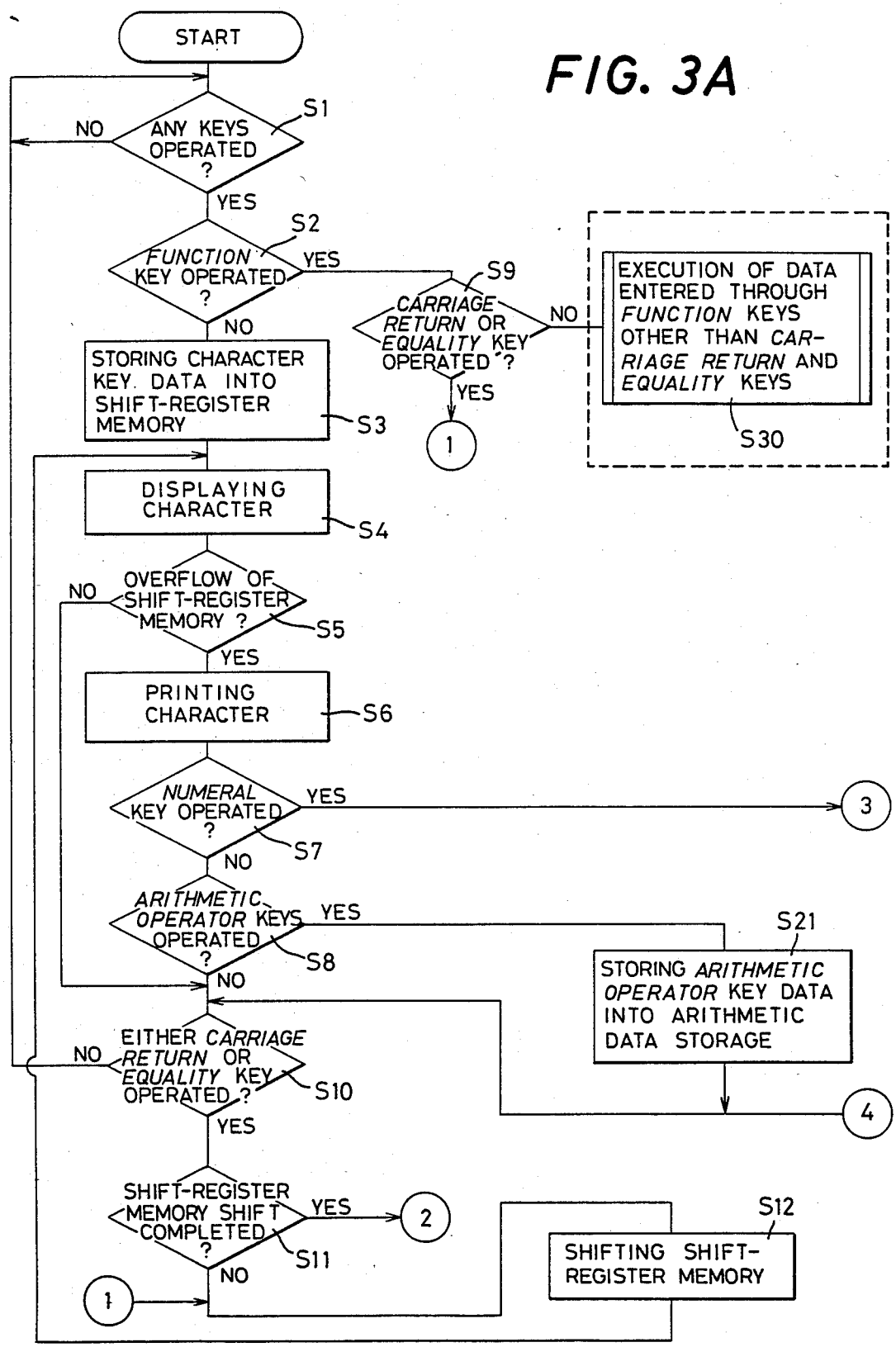
FIG. 3, comprising of FIGS. 3A-3C, is a flow diagram representing a sequence of operation of the typewriter of FIG. 1.
Figure 3B:
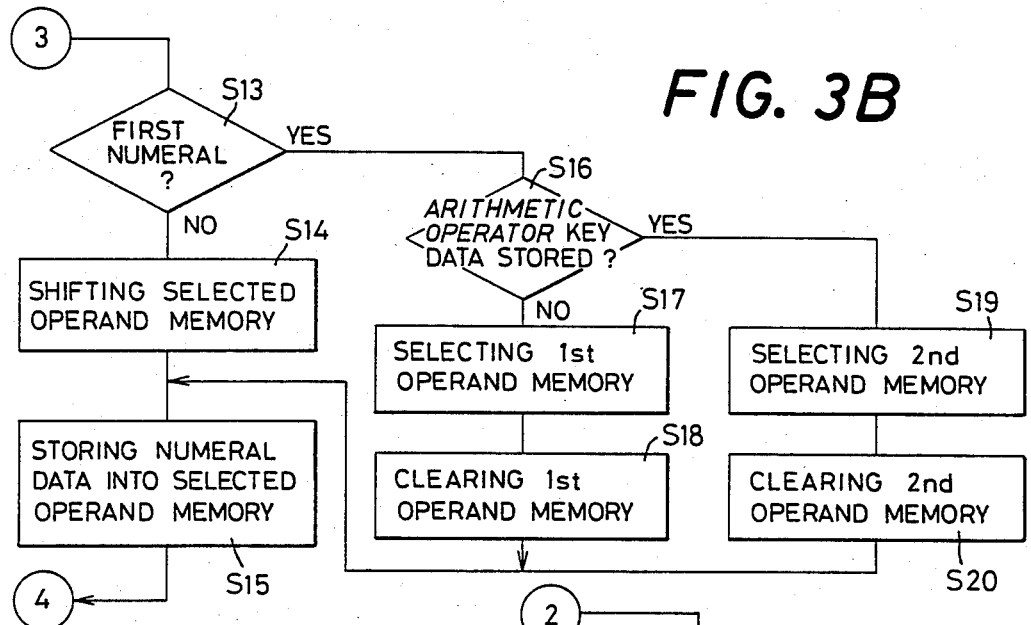
Figure 3C:
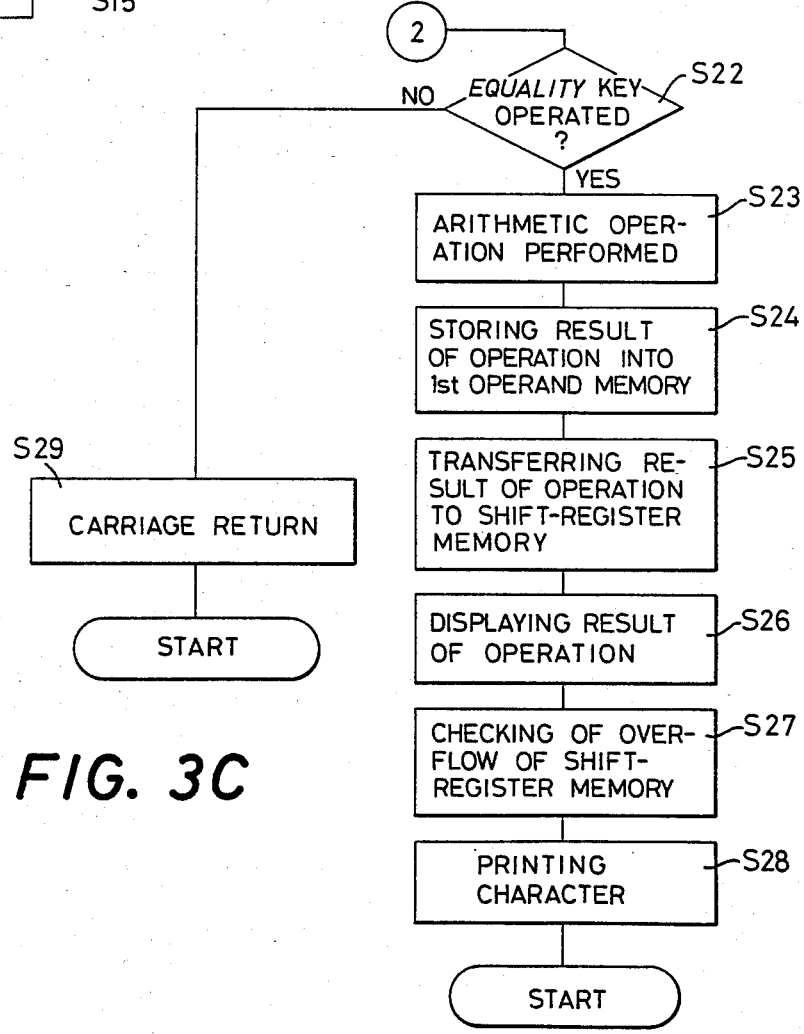

The main control unit 11, display control unit 12, print head control unit 13, and arithmetic unit 14 are designed to perform the operation illustrated in a flow diagram of FIG. 3. This flow diagram may be clearly understood when taken in connection with the following description of the operation which refers to steps of the operation indicated in parentheses, for example, as (S3), (S4), which steps are given in the diagram.

Referring back to FIG. 2, there is described an operation of the typewriter which is conducted by way of example when a succession of characters "No. 23 BALL100YEN×10PCS" are entered through the appropriate letter keys 2, numeral keys 3 and arithmetic symbol key 4. Upon operating each of the keys 2, 3, 4 and the resultant generation of corresponding electric KEYBOARD signals [A], the main control unit 11 produces code signals [B] corresponding to the generated KEYBOARD signals [A], which code signals [B] are transferred to the display control unit 12 which in turn stores the received code signals [B] in its shift-register memory 12a (S3). In response to the received code signals [B], the display control unit 12 reads out from the display pattern data memory 12b pattern data previously stored therein corresponding to the letters, numerals, arithmetic symbols, etc., and feeds appropriate DISPLAY signals [I] to the display 6 so that entries of the letters, numerals, arithmetic symbols, etc. are successively displayed on the 5×7 liquid crystal dot-matrix indicators (S4).

Each time an entered character is displayed (S4), the main control unit 11 judges whether or not the shift-register memory 12a is overflowed (S5). Since the memory 12a is not overflowed at this time, the control goes to step S10 in which the unit 11 judges whether either the carriage return key 5 or the equality key 4 has been operated or not. Since neither the carriage return key 5 nor the equality key 4 has been operated in this stage, the control then goes back to the first step S1. This sequence of operation is repeated just before the equality key 4 is operated.

When the equality key 4 is operated after the last letter "S" has been entered, the control goes to step S9 and consequently to step S12 from which the control goes to step S4 wherein the characters which have been displayed on the display 6 are shifted one position or digit to the left. Then, the control repeats to take a control path S4 - S5 - S10 - S11 - S12 - S4 until the shift-register memory 12a is overflowed.

When the shift-register memory 12a is overflowed and the characters overflow from the display 6 successively beginning with the leading character, the main control unit 11 delivers to the print head control unit 13 the code signals [B] received as an output from the shift-register memory 12a. The print head control unit 13 reads out from the print pattern data memory 13a pattern data previously stored therein corresponding to the letters, numerals, arithmetic symbols, etc., and delivers PRINT signals [H] to the printing device 7 thereby causing the print head 10 to move along the printing line and at the same time causing thermal elements (not shown) of the print head 10 to be selectively actuated so that the letters, numerals and arithmetic symbol "No. 23 BALL100YEN×10PCS" overflowing from the display 6 are printed on the heat-sensitive paper 8 through the 5×7 dot matrix (S6).

The main control unit 11 delivers to the arithmetic unit 14 the code signals [B] representing numerals and arithmetic symbols which have overflowed from the shift-register memory 12a, as numeric data signals [C] and arithmetic instruction signals [D], respectively (S7, S8). In this specific example wherein the first set of numerals entered into the arithmetic unit 14 are "23", numeric data representing the numerical value "23" are temporarily stored in a first operand memory of the arithmetic data storage 14a of the unit 14 (S15). When the next set of numerals "100" are entered following "space" and "BALL", however, the numeric data representing "23" temporarily stored in the first operand memory are judged by the main control unit 11 not to be an operand and replaced by numeric data representing the numerical value "100" whereby the first operand memory of the arithmetic data storage 14a is charged with the numeric data representative of the newly entered set of numerals "100". In other words, the last numeric data entered prior to generation of the arithmetic instruction signal [D] are stored in the first operand memory of the storage 14a as an effective operand and used in an arithmetic operation involved.

In more detail, the judgement of whether a set of numeric data is regarded as an effective operand or not is accomplished in the following manner. Each time data representing a numeral overflows from the shift-register memory 12a, the main control unit 11 judges whether the data represents the first numeral (actually, the most significant digit) of a numerical value in question, or not (S13). If the data is judged to represent the first numeral, the control unit 11 then judges whether any arithmetic operator key data (representing an arithmetic operator) has been stored or not (S16). In this specific example, the first numeric data which overflows from the memory 12a is the data representing a digit "2" of a numerical value "23" (this data being hereinafter referred to as "2"). Since no arithmetic operator key data has been stored, a negative judgement is given in step S16 whereby the first operand memory is selected (S17). The data "2" is stored in the selected first operand memory (S15) after it is cleared (S18). While the data "3" of the numerical value "23" overflows from the memory 12a, the judgement in step S13 is negative because the numeral "3" is not the first numeral which has been entered. Consequently, the data "3" is stored in the first operand memory previously selected (S15). It is noted here that the data "2" in the first operand memory is shifted one digit and the data "3" is stored following the data "2" as is well known in the art.

While data representing "1" of the second numerical value "100" overflows following sets of data representing "space" and "BALL", the first operand memory is again selected (S17) and cleared (S18) because the data "1" represents the first numeral and no arithmetic operator key data has been stored, and the data "1" is stored in the selected first operand memory (S15). Similarly, the subsequently overflowing data "0" and "0" are also stored in the first operand memory.

Then, the data representing "x" overflows following "Y", "E" and "N". Since the data "x" is an arithmetic operator key data, a positive judgement is given in step S8 whereby the data "x" is stored in an arithmetic operator memory of the arithmetic data storage 14a (S21).

Subsequently, the data "1" overflows. At this time, however, the arithmetic operator key data "x" has already been stored, a positive judgement is obtained in step S16 whereby the second operand memory is selected (S19) and cleared (S20), and the data "1" is stored therein. Similarly, the subsequently overflowing data "0" is also stored in the second operand memory. More specifically stated, any numeric data overflowing from the shift-register memory 12a after an arithmetic operator key data has been stored, will not be stored in the first operand memory. In other words, the data "100" remains in the first operand memory as the first operand of the arithmetic operation designated by the operator "x". After the data "10" has been stored in the second operand memory, only the three sets of alphabetic data "P", "C" and "S" will overflow and no numeric data representing a numerical value other than "10" will overflow. As a result, the second operand memory remains to be loaded with the data "10" which is used as the second operand of the arithmetic operation involved.

When all data stored in the shift-register memory 12a have overflowed, i.e., when the shift-register memory 12a has been shifted completely to send the last data in the manner stated above, a positive judgement is obtained in step S11 whereby the control goes to step S22. Since the equality key 4 has been operated, the arithmetic operation "100×10" is performed (S23) and a result of the operation is stored in the first operand memory of the arithmetic data storage 14a (S24).

Successively, the main control unit 11 supplies to the arithmetic unit 14 an arithmetic result INQUIRY signal [E] to read out the result of arithmetic operation, i.e., numeric data "1000" stored in the first operand memory, and delivers to the display control unit 12 the code signals [B] corresponding to the data "=" and the read-out numeric data "1000" (S25) in order to store into the shift-register memory 12a and display those data "=1000" in the same manner as previously stated.

Although the control goes to steps S26, S27, no actions will result and the control returns to the START position because the shift-register memory 12a has not been overflowed at this point of time in this specific example.

Now, letters "Y", "E" and "N" constituting a word "YEN" are entered through the appropriate letter keys 2. When the carriage return key 5 is then operated, the shift-register memory 12a is shifted in the same manner as in the case where the equality key 4 is operated, and the overflowing data "=1000YEN" are printed by the printing device 7 (S6). After the printing of "=1000YEN" has been completed, i.e., after the shift-register memory 12a has been shifted completely, the control goes to steps S22 and S29 whereby the carriage return is initiated.

For easy understanding of the invention, the foregoing description is based on the assumption that the shift-register memory 12a is not overflowed before the equality key 4 is operated. In fact, however, the shift-register memory 12a may be overflowed before the equality key 4 is operated. In this case, step S6 and the subsequent steps are executed each time a set of data representing a character overflows from the memory 12a.

It is possible that the carriage return key 5 is operated before the equality key 4 is operated. In this instance, the actuation of the carriage return key 5 will trigger the main control unit 11 to execute steps S9, S12, S5, S6, S7, S8, S22, S29, etc. and cause the printing device 7 to print all of the characters corresponding to the data stored in the shift-register memory 12a upon operation of the carriage return key. At the end of the printing of such characters, the carriage return is initiated.

In the present embodiment as described above, only the numeric data which are necessary for an arithmetic operation, i.e., only the operands on which the arithmetic operation is performed, are selected from among plural sets of numeric data which are entered through the numeral keys 3 as parts of a line of data or statement including words, numerical values and arithmetic symbols. The arithmetic operation designated by an operator (+, −, × or ÷) through the appropriate arithmetic symbol key 4 is performed on the numeric data entries selected as operands, and the result of operation is printed out following the said line of characters including letters, numerals and arithmetic symbols.

While the printing device 7 in the present embodiment has been described as the one comprising the thermal print head 10 which acts on the heat-sensitive paper 8, a printing device for use in a typewriter according to this invention is not limited in its form to the printing device 7 using a print head of thermal type. For example, the print head 10 may be replaced by an impact dot-matrix printer having print wires to permit a printing on a sheet of ordinary paper via an inked ribbon.

Although the present embodiment of the typewriter uses a display 6 and is adapted such that the characters such as letters, numerals and arithmetic symbols are printed as they overflow from the display 6 before actuation of the carriage return key 5 and such that the characters displayed on the display 6 are printed when the carriage return key 5 is actuated, it is possible to print the characters as they are entered through the respective letter, numeral and arithmetic symbol keys, and possible to print the result of an arithmetic operation designated by the appropriate arithmetic symbol key when it is obtained on the numeric data entered through the numeral keys.

Other modifications and variations of the typewriter of the invention may be made without departing from the scope of the appended claims.

What is claimed is:

1. A typewriter having a calculating function which comprises:
    a keyboard having a plurality of character keys including letter keys, numeral keys and arithmetic symbol keys;
    arithmetic means for performing an arithmetic operation designated by at least one of said arithmetic symbol keys, based on plural sets of numeric data each representing a numerical value and entered through said numeral keys said arithmetic means comprising a first and a second operand memory;
    main control means, connected to said keyboard and said arithmetic means, for selecting said plural sets of numeric data as operands from among successive sets of data entered through corresponding to the sequential operation of said letter, numeral and arithmetic symbol keys, such that only the set of numeric data which is entered last prior to each operation of any one of said arithmetic symbol keys is regarded as one of said plural sets of numeric data, said main control means generating an arithmetic instruction signal corresponding to the operation of said arithmetic symbol keys, temporarily storing one set of numeric data in said first operand memory, updating said firt operand memory by replacing said one set of numeric data with another set of numeric data in a repeated manner until said arithmetic instruction signal is generated, and storing a subsequent set of numeric data in said second operand memory after generation of said arithmetic instruction signal, thereby making the selection of said plural sets of numeric data as said operands, said main control means directing said arithmetic means to perform the arithmetic operation based on the selected plural sets of numeric data, and reading out a result of said arithmetic operation from said arithmetic means; and
    a printing device connected to said main control means for printing a succession of characters entered by said letter, numeral and arithmetic symbol keys, and said result of arithmetic operation read out by said main control means, said result being printed following said succession of characters.

2. A typewriter as recited in claim 1, wherein said main control means and said arithmetic means comprise a portion of a stored program computer.

3. A typewriter as recited in claim 1, which further comprises a display unit connected to said main control means and having a predetermined indicating capacity for indicating said succession of characters, said main control means causing said printing device to print said succession of characters as they overflow from said display unit.

4. A typewriter as recited in claim 3, wherein said keyboard further has a carriage return key, and said main control means causes said printing device to print those of said succession of characters which are indicated on said display unit when said carriage return key is operated.

5. A typewriter having a calculating function, which comprises:
    a keyboard having a plurality of keys including a special function key, letter key, numeral keys and arithmetic symbol keys;
    arithmetic means for performing an arithmetic operation designated by at least one of said arithmetic symbol keys, based on plural sets of numeric data each representing a numerical value and entered through said numeral keys;
    a dot-matrix printing device printing a succession of letters, numerals and arithmetic symbols corresponding to said letter, numeral and arithmetic symbol keys;
    printing device control means for controlling printing actions of said printing device, said printing device control means having a print pattern data memory in which are stored print pattern data corresponding to each of said letters, numerals and arithmetic symbols, and supplying the stored print pattern data to said printing device to control said printing actions;
    a photoelectric display unit indicating said succession of letters, numerals and arithmetic symbols;
    display control means for controlling indicating actions of said display unit, said display control means having a shift-register memory of predetermined digit capacity, and a display pattern data memory in which are stored display pattern data corresponding to each of said letters, numerals and arithmetic symbols, and supplying the stored display pattern data to said display unit; and
    main control means responsive to electric signals from said keyboard for controlling said arithmetic means, said printing device control means and said display control means, said main control means storing into said shift-register memory code signals corresponding to said succession of letters, numerals and arithmetic symbols, said main control means supplying to said printing device control means those of said code signals which overflow from said shift-register memory in order to cause said printing device control means to transfer to said printing device the print pattern data corresponding to said those of the code signals, said main control means further selecting said plural sets of numeric data as arithmetic operands from among successive sets of data entered corresponding to said letter, numeral and arithmetic symbol keys, such that only the set of numeric data which is entered last prior to each operation of any one of said arithmetic symbol keys is regarded as one of said plural sets of numeric data, said main control means directing said arithmetic means to perform the arithmetic operation based on the selected plural sets of numeric data and storing a result of said arithmetic operation into said shift-register memory of the display control means, said main control means supplying the code signals stored in said shift-register memory to said printing device control means in response to the operation of said special function key, whereby the typewriter is capable of not only printing a series of characters which include letters, numerals and arithmetic symbols, but also printing a result of the operation following the statement defining the operation.

6. A typewriter as recited in claim 5, wherein said arithmetic means comprises a first and a second operand memory, and said main control means generates an arithmetic instruction signal corresponding to the operation of said arithmetic symbol keys, said main control means temporarily storing one set of numeric data in said first operand memory, updating said first operand memory by replacing said one set of numeric data with another set of numeric data in a repeated manner until said arithmetic instruction signal is generated, and storing a subsequent set of numeric data in said second operand memory after generation of said arithmetic instruction signal, thereby making the selection of said plural set of numeric data as said arithmetic operands.

7. A typewriter as recited in claim 5, wherein said main control means, said display control means and said printing device control means comprise a portion of a stored program computer.

8. A method of printing on a typewriter a succession of characters including a statement representing an arithmetic equation, which comprises the steps of:

operating letter keys, numeral keys and arithmetic symbol keys on a keyboard of the typewriter to provide keyboard signals representing the succession of characters including at least one arithmetic symbol and numerical values serving as operands, which symbol and operands defining an arithmetic operation, as well as letters and other numerical values not serving as operands;

causing a stored program computer to select sets of numeric operand data corresponding to said numerical values serving as operands from among plural sets of numeric data represented by those of said keyboard signals which are generated corresponding to the operation of said numeral keys, such that only the set of numeric data which is entered last prior to each operation of any one of said arithmetic symbol keys is regarded as said numeric operand data, said stored program computer generating an arithmetic instruction signal corresponding to the operation of said arithmetic symbol keys, temporarily storing one set of numeric data in a first operand memory; updating said first operand memory by replacing said one set of numeric data with another set of numeric data in a repeated manner until said arithmetic instruction signal is generated; and storing a subsequent set of numeric data in a second operand memory after generation of said arithmetic instruction signal, thereby selecting said plural sets of numeric operand data;

performing said arithmetic operation based on said sets of numeric operand data selected by said stored program computer; and printing said succession of characters entered through said keyboard, and a result of said arithmetic operation following said succession of characters.

* * * * *